3,001,910
ANOREXIGENIC PROPIOPHENONES
Jandirk Schütte, Hamburg-Neugraben, Germany, assignor to Firma Temmler-Werke, Hamburg-Neugraben, Germany
No Drawing. Filed Apr. 16, 1958, Ser. No. 728,790
12 Claims. (Cl. 167—55)

The present invention relates to a novel appetite satient composition, and more particularly to a composition which when administered orally or by suppository causes a marked reduction in appetite of the person taking the composition.

This application is a continuation-in-part of my copending application Serial No. 675,262, filed July 31, 1957, now abondoned, for "Appetite Satient Composition."

The known appetite satient compositions such as 1-phenyl-2-methylaminopropane and 2-phenyl-3-methyl-tetrahydro-1,4-oxazine have the disadvantage of side effects undesirable or even harmful for many persons such as an increase in blood pressure and an agitating or irritating effect.

It is therefore a primary object of the present invention to provide a new appetite satient composition which upon being taken internally has the effect of causing loss of appetite and thereby loss of weight without having the undesirable side effects of the known appetite satient compositions or only with slight insignificant side effects.

It is another object of the present invention to provide a new appetite satient composition which does not undesirably influence the blood pressure.

It is still another object of the present invention to provide an appetite satient composition which can be taken before going to sleep without impairing the rest.

It is a further object of the present invention to provide a safe appetite satient composition which can be given before meals, and if desired before going to sleep, in order to cause loss of appetite and thereby loss of weight.

Other objects and advantages of the present invention will be apparent from a further reading of the specification and of the appended claims.

With the above objects in view, the present invention mainly consists in a new composition of matter adapted when taken internally to cause loss of appetite, said composition consisting essentially of a pharmaceutical carrier and at least one substance selected from the group consisting of compounds having the following structural formula:

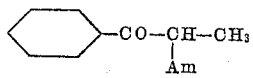

wherein Am is selected from the group consisting of di-alkyl-substituted amino groups, and 5- and 6-member nitrogen-containing heterocyclic ring radicals linked to the propanone side chain by a nitrogen atom; and non-toxic acid addition salts thereof.

The substituent Am may be a di-alkyl substituted amino group in which the alkyl groups may be the same or different alkyl groups. Thus, each of the alkyl groups may be methyl, ethyl, n-propyl, isopropyl, butyl, amyl, hexyl, decyl, dodecyl. Preferably the alkyl groups contain 1–12 carbon atoms each, more preferably 1–6 carbon atoms each, and most preferably 2–5 carbon atoms each. Among the suitable compounds for the purposes of the present invention when Am is a di-alkyl substituted amino group may be mentioned dimethylaminopropiophenone, diethylaminopropiophenone, ethyl-propylaminopropiophenone, dipropylaminopropiophenone, dibutylaminopropiophenone, ethyl-butylaminopropiophenone, ethyl-dodecylaminopropiophenone, ethyl-amylaminopropiophenone, etc.

The substituent Am may also be a 5- or 6-member nitrogen-containing heterocyclic ring radical linked to the propanone side chain by a nitrogen atom, such as the following radicals: piperidyl ($C_5H_{10}N$—), pyrryl ($C_4H_4N$—), pyrrolyl ($C_4H_6N$—), pyrrolidyl ($C_4H_8N$—), morpholino ($C_4H_8ON$—), 1,4-piperazino ($C_4H_9N_2$—), N-methyl-piperazino ($C_5H_{11}N_2$—), etc. Thus, among the suitable compounds for the purposes of the present invention when Am is a 5- or 6-member heterocyclic nitrogen-containing ring radical may be mentioned piperidylo-propiophenone, pyrrylo-propiophenone, pyrrolylo-propiophenone, pyrrolidylo-propiophenone, etc.

In addition to the free bases mentioned above, the compounds of the present invention may also be used in the form of their non-toxic acid addition salts such as the hydrochloride, sulfate, tartrate, acetate, adipinate, citrate, lactate, maleinate, mandelate, orthophosphate, pyrophosphate, propionate, succinate salts and the like.

The compounds of the present invention may be used with any of the normal solid or liquid pharmaceutical carriers suitable for oral or suppository administration. It is to be understood that the term "pharmaceutical carrier" as used throughout the specification and claims of this case is meant to include all of the usual pharmaceutical carriers, filler substances and additives suitable for oral or suppository administration such as the starches (rice starch, corn starch, potato starch, wheat starch and the like) milk sugar, dextrose, mannitol, manna sugar, beet sugar, talcum, lactalbumin, alginates, Fucus vesiculosus, agar-agar, tragacanth, Iceland moss, polyethyleneglycols, paraffin, magnesium stearate, stearic acid, gelatin, gum arabic, etc. The composition of the present invention can be taken orally or in the form of suppositories utilizing as pharmaceutical carrier for such purpose substances such as cocoa butter, Massa estarinum, carbowax, etc. It is also possible to form appetite satient compositions in accordance with the present invention utilizing the compounds set forth above in combination with food supplement substances such as vitamins, and minerals, for example sodium fluoride, potassium iodide, manganese sulfate, zinc sulfate, boric acid, cobalt sulfate and the like. In such compositions the appetite satient effect is caused by the propiophenone derivative of the present invention so that the other substances such as the above mentioned minerals may in such composition be considered as "pharmaceutical carriers."

Besides the substances denominated according to this invention the ready mixed pharmaceutical composition may contain other therapeutically active compounds such as a laxative, sedative or such like.

A unit dose of the composition of the present invention, which is usually given three times a day about one half to one hour before each meal, and if desired may also be given in the evening before going to bed, may consist of between 5 and 150 mg. of the propiophenone derivative and preferably consists of about 20–50 mg. of the propiophenone derivative plus a suitable amount of the pharmaceutical carrier. The amount of pharmaceutical carrier may vary as desired for the making of suitable tablets, dragees, capsules, suppositories, liquids, emulsions or tinctures. Most preferably about 25 mg. of the propiophenone derivative plus the pharmaceutical carrier which may include or consist of food supplements or the like constitutes a suitable unit dose.

As mentioned above, the great advantage of the composition of the present invention lies in the fact that the composition can cause significant loss of appetite without causing irritation and without having any undesirable effect on the blood pressure. An additional advantage of the composition of the present invention is that the composition has a very slight diuretic action which also improves the possibility of causing loss of weight by means of these compositions.

Tests on human beings were carried out in which overweight patients were given tablets consisting of 25 mg. of α-diethylaminopropiophenone and about 150 mg. of pharmaceutical carriers such as milk sugar, stearine, talcum and magnesium stearate. Patients were given three such tablets a day one half to one hour before each meal without any particular diet instructions. The patients lost on an average of about 2.2 pounds per week. Constant supervision of the patients showed no irritation or excitation as a result of these tablets and also no influence on the blood pressure.

Animal tests were also carried out to compare the compound of the present invention with the known appetite satient compounds. The following compounds were tested:

I. α-Diethylaminopropionphenone
II. α-Pyrrolidino-propiophenone
III. 1-phenyl-2-methylaminopropane
IV. 2-phenyl-3-methyltetrahydro-1,4-oxazine The following table summarizes the results of the tests carried out:

| Preparation | Toxicity, MLD in mg./kg. | | | Blood Pressure | Spontaneous motility-analeptic action in comparison to III—arbitrarily set at 100% |
|---|---|---|---|---|---|
| | i.v. | s.c. | per os | | Percent |
| I | 100.0 | 240 | 600 | 5 mg./kg. and 10 mg./kg. given i.v. have no influence on the blood pressure and on the breathing. | 14.2 |
| II | 92.0 | 455 | | 5 mg./kg. i.v.—no influence on the blood pressure and the breathing; 10 mg./kg. i.v. causes lowering of blood pressure by 70 mm. Hg which becomes normal in 90 minutes. | 44.2 |
| III | 8.0 | 20.5 | 55 | 1 mg./kg. i.v. causes increase of blood pressure by 60 mm. Hg. After 30 minutes pressure returns to original level. | 100.0 |
| IV | | 195 | 475 | 2 mg./kg. i.v. causes increase of blood pressure by 60 mm. Hg. | 66.2 |

The spontaneous motility was determined by measuring in a predetermined testing arrangement the amount of sand thrown out by the mice during a specific time period. The MLD tests were determined on mice and the blood pressure on cats.

To measure the appetite satient effect on animals a group of rats were treated collectively for six weeks with the above substances. The rats were injected with the test substances, the control rats being injected with the same amount of 0.9% sodium chloride solution, the injections being interperitoneal (i.p.). The rats were fed once a day and it was determined what amount of the high value feed the rats had eaten one half hour after the injection of the substances.

The following table summarized the average values determined from these tests:

TABLE II

| Preparation | Injected Amount i.p. daily | Amount of Feed Eaten after 30 minutes Average Value |
|---|---|---|
| I | 5 mg./kg. | 7.0 g.±1.0. |
| II | 5 mg./kg. | 15.0 g.±1.83. |
| III | 1 mg./kg. | 19.0 g.±1.99. |
| IV | 5 mg./kg. | 41.0 g.±2.57. |
| Control | 0.5 ml. of 0.9% NaCl solution. | 48.0 g.±1.94. |

The amount of preparation III given to the animals was less than in the case of the other preparations because if more were given the animals became extremely irritated.

Continued feeding tests on growing rats which were given 10.0 g. of feed per day showed a marked reduction in the weight increase of rats which were orally given preparation I (mixed with the feed) as compared to a group of control rats. The results of these tests are summarized in the following table:

TABLE III

*Average weight of each of ten animals*

| Date | Controls, g. | Animals Given Preparation I, g. |
|---|---|---|
| Jan. 2 | 146.0 | 160.0 |
| Mar. 6 | 179.0 | 168.0 |

The compounds of the present invention may be produced by reacting α-bromopropiophenone with the corresponding amine or heterocyclic ring compound and isolating the end product, most simply as the salt thereof.

The following example will illustrate the production of a compound of the present invention.

EXAMPLE I 1145 g. of α-bromopropiophenone and 850 g. of diethylamine are combined under stirring and heated on a water bath to boiling. The precipitate is filtered off under suction and washed with benzol. The filtrate is shaken up with aqueous hydrogen chloride, the aqueous solution made alkaline and etherified. The solution freed of the ether is fractionated. The boiling point (6 mm.) is 140° C. and the yield 800 g. The base is dissolved in acetic ester and precipitated with isopropanolic hydrogen chloride. After suction filtration and washing with ether the yield is found to be 750 g. (80%) and the melting point 168° C.

The following examples will illustrate compositions in accordance with the present invention, the scope of the invention not, however, being limited to the specific details of these examples.

EXAMPLE II

A dragee is prepared having the following composition:

| | Mg. |
|---|---|
| (a) α-Diethylaminopropiophenone-hydrochloride | 25 |
| (b) Sodium fluoride | 0.2 |
| Potassium iodide | 0.05 |
| Manganese sulfate | 1.0 |
| Zinc sulfate | 0.1 |
| Acidum boricum | 0.01 |
| Cobalt sulfate | 0.1 |
| (c) Saccharum lactis | 103.6 |
| Amylum maidis | 58.0 |
| Gelatin | 2.4 |
| Stearine | 2.0 |
| Talcum | 7.0 |
| Magnesium stearate | 2.0 |

Constituent (a) acts to cause loss of appetite, constituent (b) consists of trace elements utilized in substitution therapy and constituent (c) consists of tableting filler materials, lubricants and binding agents.

It is of course apparent that the type and amounts of constituents (b) and (c) can vary within a very wide range so that a similar dragee in accordance with the present invention can conveniently contain 100, 200 or 300 mg. of pharmaceutical carrier materials of the above or other types.

One dragee given before each meal acts as an effective appetite satient causing loss of weight as a result.

EXAMPLE III

A liquid composition is prepared in which each 150 cc. contains the following:

|  | Mg. |
|---|---|
| (a) α-Ethylpropylaminopropiophenone-sulfate mg | 750 |
| (b) Sodium fluoride mg | 6 |
| Potassium iodide mg | 1.5 |
| Manganese sulfate mg | 30 |
| Zinc sulfate mg | 3 |
| Boric acid mg | 0.3 |
| Cobalt sulfate mg | 3 |
| (c) Sirupus simplex g | 50.0 |
| Vanillin mg | 50 |
| Tinctura aurantii g | 3.0 |
| Preservative (Nipagin) mg | 200 |
| Distilled water, q.s. cc | 150.0 |

One teaspoon given about one half to one hour before each meal acts as an effective appetite satient resulting in marked loss of weight without the patient being placed on any particular diet.

EXAMPLE IV 1000 tablets are prepared as follows:

28 g. of di-n-propylaminopropiophenone phosphate are dissolved in 20 cc. of ethyl alcohol, mixed with 103 g. of saccharum lactis and dried. The following substances:

0.2 g. sodium fluoride
0.05 g. potassium iodide
1.0 g. manganese sulfate
0.1 g. zinc sulfate
0.1 g. cobalt sulfate
0.01 g. boric acid are dissolved in 25 cc. of water together with 2.4 g. of gelatin, taken up in 58 g. of corn starch, mixed with the di-n-propylaminopropiophenone phosphate, granulated, dried and with the addition of 2.0 g. of stearine, 7.0 g. of talcum, and 2.0 g. of magnesium stearate pressed into 1000 tablets.

It is, of course, possible to use saccharum album, dextrose or mannitol in place of the saccharum lactis. Each tablet has a weight of about 0.2 g.

These tablets are given three times a day about one half hour before each meal. When taken in this manner the tablets cause loss of appetite and consequent loss of weight, the loss of weight averaging about 2 pounds per week.

EXAMPLE V

In the same manner as in Example IV substituting 50 g. of di-n-butylaminopropiophenone citrate for the 28 g. of di-n-propylaminopropiophenone phosphate in Example IV 1000 kernels are pressed. These are colored orange and drawn into the form of dragees with 0.01% vanillin mixed sugar in the form of a syrup.

These dragees may be given one half to one hour before each meal to cause loss of appetite.

EXAMPLE VI 50 g. of an aqueous solution of 25 g. of α-pyrrolidinopropiophenone succinate together with the trace elements and filler materials set forth in Example IV is in the normal manner granulated and pressed into 1000 tablets. These tablets are colored orange and given an orange taste and drawn into the form of dragees.

These dragees may be given three times a day about one hour before each meal to cause loss of appetite.

EXAMPLE VII 25 g. of diethylaminopropiophenone hydrochloride are carefully dispersed in 50 g. of a mixture, consisting of 100.5 g. of polyethyleneglycol 400 (U.S.P. XV) and 6.0 g. of polyethyleneglycol 4000 (U.S.P. XV). This paste is mixed with a suspension of the following finely powdered substances:

0.2 g. sodium fluoride
0.05 g. potassium iodide
1.0 g. manganese sulfate
0.1 g. zinc sulfate
0.1 g. cobalt sulfate in 48.55 g. of the above described polyethyleneglycol mixture.

This mixture is introduced into gelatin capsules in an amount of 0.125 g. per each capsule. These capsules can be given a pleasant taste with vanillin or lemon flavor. Instead of polyethyleneglycol it is possible to use liquid paraffin or another indifferent base.

One capsule given three times a day before meals causes marked loss of appetite and thereby loss of weight.

EXAMPLE VIII 1.0 g. of diethylaminopropiophenone and
3.0 g. citric acid
6.0 g. sodium alginate
20.0 g. manna sugar
0.1 g. lemon oil
0.008 g. sodium fluoride
0.002 g. potassium iodide
0.040 g. manganese sulfate
0.004 g. zinc sulfate
0.004 g. cobalt sulfate
0.0004 g. boric acid
0.2 g. Nipagin are dissolved in water q.s. 200 g.

Before use the liquid is shaken. One full teaspoon three times a day given one half hour before each meal causes a marked reduction in appetite and loss of weight.

EXAMPLE IX 1.0 g. of methylpropylaminopropiophenone hydrochloride together with
5.0 g. *Fucus vesiculosus*
0.1 g. tartaric acid
0.2 g. Nipagin
0.0584 g. trace elements as in Example VIII
1.0 g. Tween 80 are dissolved in 142.3 g. of warm water (40° C.) and emulsified with a mixture of 0.1 g. of oil of aurantii in 50.0 g. of liquid paraffin. This emulsion should be shaken before use. One teaspoonful of this composition three times a day one half hour before each meal causes considerable loss of appetite.

EXAMPLE X 0.8 g. of dimethylaminopropiophenone sulfate together with
3.0 g. agar-agar
0.1 g. tartaric acid
0.2 g. Nipagin
0.0584 g. trace elements as in Example VIII
1.0 g. Tween 80 are dissolved in 144.74 g. of warm water (40° C.) and emulsified with a mixture of 0.1 g. of oil of aurantii in 50.0 g. of liquid paraffin. This emulsion should be shaken before use. One teaspoonful of this composition three times a day one half hour before each meal causes considerable loss of appetite.

EXAMPLE XI 0.7 g. of ethylaminopropiophenone citrate together with
5.0 g. Phytolaccae D4
5.0 g. Gelsemium D4
5.0 g. Scilla D4
5.0 g. Bryonia D4 are formed into a tincture of 25. g. 6–15 drops of this tincture, preferably 10 drops, given three times a day about one half to one hour before each meal causes loss of appetite and consequent loss of weight.

EXAMPLE XII

Suppositories each weighing about 2 g. are prepared as follows:

0.6 g. of propylaminopropiophenone hydrochloride are dissolved in 10 g. of acetone mixed with 5.4 g. of Aerosil. The solvent is evaporated and in this manner the amine salt is precipitated in finest subdivision on the Aerosil which acts as carrier substance. This mass is finely pulverized, sifted and mixed with 14 g. of a suppository mass such as cocoa butter which is liquefied at a temperature of 38°–40° C. This mixture is poured into the form of suppositories each weighing about 2 g. These suppositories may be inserted one half to one hour before each meal to cause loss of appetite.

Without further analysis, the foregoing will so fully reveal the gist of the present invention that others can by applying current knowledge readily adapt it for various applications without omitting features that, from the standpoint of prior art, fairly constitute essential characteristics of the generic or specfic aspects of this invention, and therefore, such adaptations should and are intended to be comprehended within the meaning and range of equivalence of the following claims.

What is claimed as new and desired to be secured by Letters Patent is:

1. A new composition of matter adapted when taken internally to cause loss of appetite, said composition in dosage unit form consisting essentially of a pharmaceutical carrier adapted for internal administration and between about 5 and 150 mg. of at least one substance selected from the group consisting of compounds having the following structural formula:

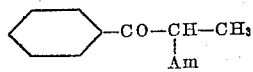

wherein Am is a di-alkyl-substituted amino group the alkyl groups of which each contain 2 to 5 carbon atoms.

2. A new composition of matter adapted when taken internally to cause loss of appetite, said composition in dosage unit form consisting essentially of a pharmaceutical carrier adapted for internal administration and between about 5 and 150 mg. of diethylaminopropiophenone.

3. A new composition of matter adapted when taken internally to cause loss of appetite, said composition in dosage unit form consisting essentially of a pharmaceutical carrier adapted for internal administration and between about 5 and 150 mg. of alpha-pyrrolidino-propiophenone.

4. A new composition of matter adapted when taken internally to cause loss of appetite, said composition in dosage unit form consisting essentially of a pharmaceutical carrier adapted for internal administration and between about 5 and 150 mg. of α-ethylpropylaminopropiophenone.

5. A new composition of matter adapted when taken internally to cause loss of appetite, said composition in dosage unit form consisting essentially of a pharmaceutical carrier adapted for internal administration and between about 5 and 150 mg. of di-n-propylaminopropiophenone.

6. A new composition of matter adapted when taken internally to cause loss of appetite, said composition in dosage unit form consisting essentially of a pharmaceutical carrier adapted for internal administration and between about 5 and 150 mg. of piperazinopropiophenone.

7. A new composition of matter adapted when taken internally to cause loss of appetite, said composition in dosage unit form consisting essentially of a pharmaceutical carrier adapted for internal administration and between about 5 and 150 mg. of at least one substance selected from the group consisting of compounds having the following structural formula:

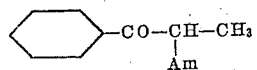

wherein Am is selected from the group consisting of di-alkyl-substituted amino groups the alkyl groups of which each contain 2 to 5 carbon atoms, 5- and 6-member nitrogen-containing heterocyclic ring radicals linked to the propanone side chain by a nitrogen atom and being selected from the group consisting of piperidyl, pyrryl, pyrrolyl, pyrrolidyl, morpholino, piperazino and N-methyl piperazino radicals; and non-toxic acid addition salts thereof.

8. A method useful in the treatment of overweight persons to cause loss of appetite and thereby loss of weight which comprises administering to such person at least one substance selected from the group consisting of compounds having the following structural formula:

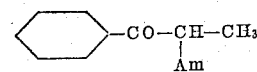

wherein Am is selected from the group consisting of di-alkyl-substituted amino groups the alkyl groups of which each contain 2 to 5 carbon atoms, 5- and 6-member nitrogen-containing heterocyclic ring radicals linked to the propanone side chain by a nitrogen atom and being selected from the group consisting of piperidyl, pyrryl, pyrrolyl, pyrrolidyl, morpholino, piperazino and N-methyl piperazino radicals; and non-toxic acid addition salts thereof.

9. A method useful in the treatment of overweight persons to cause loss of appetite and thereby loss of weight which comprises orally administering to such person per unit dose between about 5 and 150 mg. of at least one substance selected from the group consisting of compounds having the following structural formula:

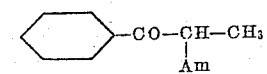

wherein Am is selected from the group consisting of di-alkyl-substituted amino groups the alkyl groups of which each contain 2 to 5 carbon atoms, 5- and 6-member nitrogen-containing heterocyclic ring radicals linked to the propanone side chain by a nitrogen atom and being selected from the group consisting of piperidyl, pyrryl, pyrrolyl, pyrrolidyl, morpholino, piperazino and N-methyl piperazino radicals, and non-toxic acid addition salts thereof.

10. A method useful in the treatment of overweight persons to cause loss of appetite and thereby loss of weight which comprises administering to such person before meals up to four times a day a unit dose of between about 5 and 150 mg. of at least one substance selected from the group consisting of compounds having the following structural formula:

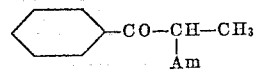

wherein Am is selected from the group consisting of di-alkyl-substituted amino groups the alkyl groups of which each contain 2 to 5 carbon atoms, 5- and 6-member nitrogen-containing heterocyclic ring radicals linked to the propanone side chain by a nitrogen atom and being selected from the group consisting of piperidyl, pyrryl, pyrrolyl, pyrrolidyl, morpholino, piperazino and N-methyl piperazino radicals, and non-toxic acid addition salts thereof.

11. A method useful in the treatment of overweight persons to cause loss of appetite and thereby loss of weight which comprises administering diethylaminopropiophenone to such persons.

12. A method useful in the treatment of overweight mammals to cause loss of appetite and thereby loss of weight which comprises administering to such mammals at least one substance selected from the group consisting of compounds having the following structural formula:

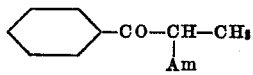

wherein Am is selected from the group consisting of dialkyl-substituted amino groups the alkyl groups of which each contain 2 to 5 carbon atoms, 5- and 6-member nitrogen-containing heterocyclic ring radicals linked to the propanone side chain by a nitrogen atom and being selected from the group consisting of piperidyl, pyrryl, pyrrolyl, pyrrolidyl, morpholino, piperazino and N-methyl piperazino radicals, and non-toxic acid addition salts thereof.

References Cited in the file of this patent

UNITED STATES PATENTS 2,155,194   Kamlet  ---------------- April 18, 1939

FOREIGN PATENTS 681,849   Germany ---------------- Oct. 3, 1939

OTHER REFERENCES

Adams: Chem. Abst. 24, 4358–9, 1930.
Rubin et al.: Chem. Abst. 34, 1669(3), 1940.
Brauner et al.: Wilner Medizinische Wochenschrift, 1951, pp. 288–290, No. 16.
Jores et al.: Die Medizinische, June 14, 1952, pp. 815–818, No. 24.
Marsh et al.: J. Pharm. and Exptl. Theraps., September 1950, 100:1, pp. 298–300.
Issekutz: Chem. Abst., vol. 49, 1955, pp. 3394i and 3395A.
Hyde: J.A.C.S., vol. 50, July, December 1928, pp. 2287–2292.